Aug. 18, 1964 H. FORWALD Re. 25,631
AIR BLAST CIRCUIT BREAKER
Original Filed Feb. 6, 1952
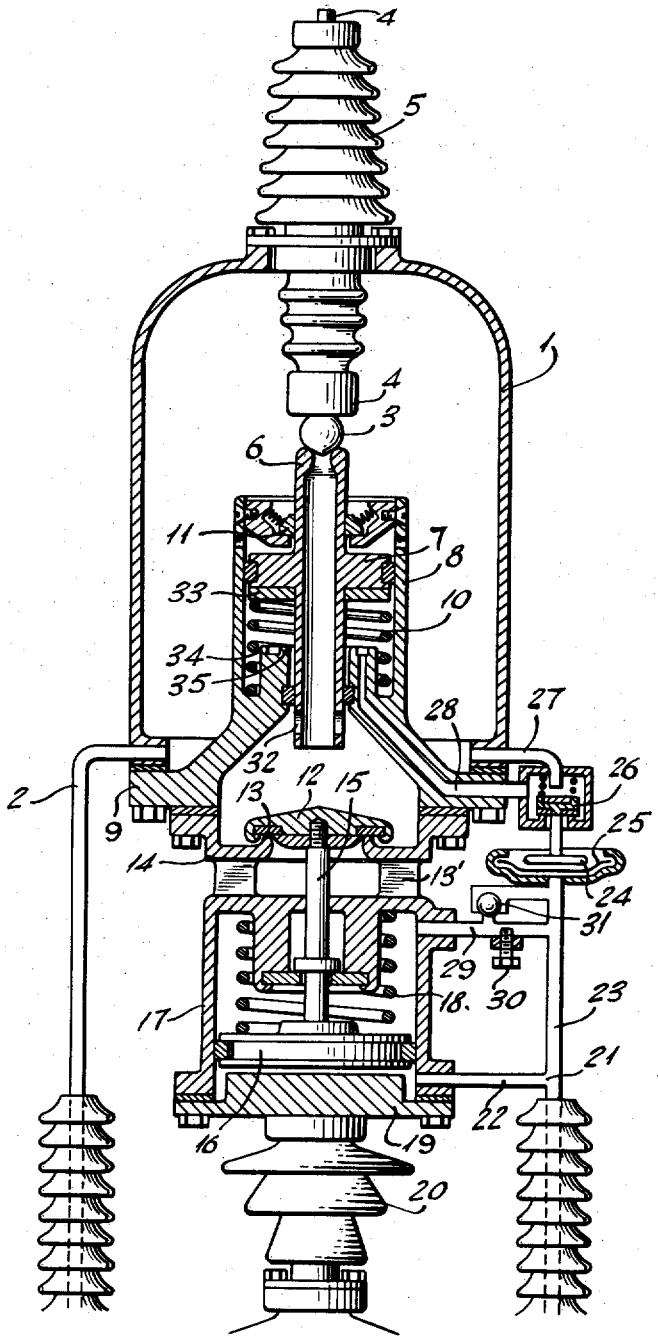
INVENTOR
HAAKON FORWALD
BY
ATTORNEY United States Patent Office Re. 25,631
Reissued Aug. 18, 1964

25,631
AIR BLAST CIRCUIT BREAKER

Haakon Forwald, Ludvika, Sweden, assignor to Allmanna Svenska Elektriska Aktiebolaget, Vasteras, Sweden, a Swedish corporation Original No. 2,724,751, dated Nov. 22, 1955, Ser. No. 270,169, Feb. 6, 1952. Application for reissue Apr. 20, 1962, Ser. No. 190,526
Claims priority, application Sweden Feb. 9, 1951
9 Claims. (Cl. 200—148)

Matter enclosed in heavy brackets [ ] appears in the original patent but forms no part of this reissue specification; matter printed in italics indicates the additions made by reissue.

For the effective interruption of the current in air blast circuit breakers it has proved to be of great importance that the air intended to strike the arc at the separation of the contacts is at rest before the streaming commences, so that there are no whirls in it, when it reaches the arc. In the hitherto known air blast circuit breakers the air is delivered to the breaking gaps through relatively long and narrow conducts or channels immediately before the interruption shall take place. Under these circumstances it is impossible to prevent the air from reaching the breaking gap in a rather agitated state with plenty of whirls, and this is the case also if the breaking gap is enclosed in an extinguishing chamber and is located in a distance from the point where the air enters the extinguishing chamber. The reason for this is that the volume of the extinguishing chamber generally is so small that the air volume enclosed in it is insufficient for the extinction, so that during the extinction period compressed air must be delivered continuously to the extinguishing chamber. The disadvantageous influence of such air whirls on the extinction of the arc is a result of the fact that the whirls in the air cause a very uneven electric strength of the air due to the formation of pockets in the air having a rather low pressure.

The present invention concerns an arrangement of air blast circuit breakers by which the said disadvantage is avoided, and in accordance with the invention, the breaking contacts are arranged in an air container of metal carried by an insulating pillar and having a volume sufficient to deliver with only a negligible pressure drop the whole air volume necessary for an extinction, the contacts being arranged close to an outlet opening in the said container air blast.

The escape of the air from the container may be controlled either by the contacts themselves forming an outlet valve, *in which case the contacts must be immediately reclosed after a breaking action to shut off the flow of extinguishing air,* or this escape may be controlled by a separate outlet *valve located downstream with respect to the contacts* [arranged after the contacts counted in the direction of the air flow]. *In the latter case the contacts can be retained in open position to continuously isolate the circuit.* The air container is further connected by a relatively narrow pipeline with a source for compressed air, so that after the extinction the container again is filled with air with the full pressure.

An especially advantageous construction can be attained if the air container is arranged on an insulating pillar of a suitable design and one contact of the breaking gap is metallically connected with the container, whereas the other contact is carried by an insulating bushing projecting into the container. A circuit breaker having two breaking gaps in each air container is also possible, and in this case the container has two outlet ducts which after the contacts may be joined to a single channel which is provided with a single outlet valve. In this case the container contains two contacts carried each by its bushing, whereas the two other contacts of the contact pairs are metallically connected with the container.

On the accompanying drawing a form of the invention is shown. On the drawing 1 designates the compressed air container which by a [conduct] *conduit* 2 of insulating material is in communication with a source of compressed air not shown on the drawing. 3 designates the stationary contact of the circuit breaker which is attached to the conductor 4 in the insulating bushing 5. The movable contact 6 is of tubular form and is attached on a piston 7, which moves in a cylinder 8 joined with the bottom 9 of the compressed air container. The piston 7 is actuated upwards by a helical spring 10. 11 is a sliding contact surrounding the tubular contact 6 for carrying the current to the cylinder 8 and the bottom 9 of the container 1. 12 is the valve disc in an outlet valve which when in its lower position tightly rests against the ridge 13 on a cover 14. The valve disc 12 is carried by a stem 15 which is joined with the operating piston 16 for the valve which piston is movable in the operating cylinder 17 and actuated downwards by the helical spring 18. The cylinder 17 is at its lower end closed by a bottom 19 attached to the insulating pillar 20 carrying the circuit breaker. 21 is the operating air pipeline which is made from some insulating material and is divided into two branches 22 and 23. When opening the circuit breaker, compressed air flows through the pipe 22 to the cylinder 17 below the piston 16, and acts upwards on this piston against the counter-action of the spring 18, and when the piston 16 moves upwards, the valve disc 12 is raised so that the air in the container 1 can escape into the open air through the openings 13[1]. Simultaneously air flows through the pipe 23 against the operating member 24, which consists of a disc actuated by a diaphragm 25. When the operating member 24 moves upwards, a valve disc 26 closes the pipeline 27 leading to the compressed air container and opens instead a communication 28 between the lower part of the cylinder 8 and the open air. A part of the compressed air flowing upwards through the pipeline 23 will flow through the pipeline 29 into the upper part of the cylinder 17 for the purpose of moving the piston 16 to its lower position after the extinction has taken place and to thus close the outlet valve 12, 13. The moment of closing is determined by the air flow through the pipeline 29, which flow is regulated by means of the restriction screw 30. 31 is a non-return valve which allows a rapid emptying of the upper part of the cylinder 17 when the pipeline 21 is evacuated for the purpose of closing the circuit breaker.

The opening of the contact gap is performed by the compressed air in the container 1 acting on the upper side of the piston 7 forcing it downwards and compressing the spring 10. The air in the lower part of the cylinder 8 will then escape to the open air through the pipeline 28.

The motion downwards of the contact 6 is limited by striking the valve member 12 and then the extinguishing air escaping through the lower end of the pipe will now escape through the side openings 32. By this arrangement the breaking gap during the extinction period is maintained comparatively short but then is extended when the valve member 12 moves downwards. When the piston 7 has reached its lowermost position, the channel 28 becomes closed by the packing 33 on the lower side of the piston 7 being forced against the two annular formed ridges 34 and 35. *Thus atmospheric pressure acts on a part of the lower surface of piston 7 and as the whole upper surface of this piston is subjected to air of a relatively high pressure, the movable contact 6 is retained in its wholly open position to continuously isolate the circuit until valve disc 26 is again operated.*

The closing of the circuit breaker is performed by evacuating the pipeline 21. When evacuating this pipeline the valve disc 26 moves downwards, so that the space in the cylinder 8 below the piston 7 by means of the pipelines 28 and 27 will be brought in communication with the space in the container 1, and the pressure prevailing in this container will thus also be prevailing on the lower side of the piston 7, so that it will be moved upwards by the spring 10 until the contacts 3 and 6 are brought in contact with each other. Simultaneously the lower part of the cylinder 17 is emptied through the pipeline 22 and its upper part through the back valve 31.

I claim as my invention:

[1. An air blast circuit breaker comprising a metal compressed air container having a capacity sufficient to contain a volume of air for at least one current interruption, a pipeline delivering compressed air to said container, insulating means serving as the sole support for said container and insulating it from earth, an air outlet opening in said container, a pair of contacts in said container in close proximity to said outlet, an insulating bushing projecting into said container and carrying one of the contacts of said pair, and valve means for controlling the flow of air from said container through said outlet opening and for opening and closing said contacts.]

[2. A circuit breaker according to claim 1, comprising means for connecting one of said contacts electrically with said container.]

[3. A circuit breaker according to claim 2, comprising means for the passage of extinguishing air from said outlet and an air control valve in said means for controlling the flow of air from said contact pair.]

[4. A circuit breaker according to claim 3, in which said valve is mounted for movement into the path of the movable contact of the said contact pair and serves to control the extent of the movement of said movable contact.]

5. *An air blast circuit breaker comprising a metal compressed air container having a capacity sufficient to contain a volume of air for at least one current interruption, a pipe line delivering compressed air to said container, insulating means serving as the sole support for said container and insulating it from earth, an air outlet opening in said container, a passage leading outwardly from said air outlet opening, a pair of contacts in said container in close proximity to said outlet opening, an insulating bushing projecting into said container and carrying one of the contacts of said pair, means for electrically connecting the other contact of said pair with the container, and valve means, including a valve in said passage downstream of said contacts movable independently of said contacts, for controlling the flow of air from said container through said outlet opening and for opening and closing said contacts, and means to move the valve to closed position while the contacts remain open.*

6. *An air blast circuit breaker comprising a metal compressed air container having a capacity sufficient to contain a volume of air for at least one current interruption, a pipe line delivering compressed air to said container, insulating means serving as the sole support for said container and insulating if from earth, an air outlet opening in said container, a pair of contacts in said container in close proximity to said outlet opening, an insulating bushing projecting into said container and carrying one of the contacts of said pair, means for connecting the other of said contacts electrically with said container, valve means for opening and closing said contacts, and means for the passage of extinguishing air from said outlet opening and an air control valve in said last mentioned means movable independently of said contacts for controlling the flow of air from the contact pair in said container through said outlet opening.*

7. *An air blast circuit breaker comprising a metal compressed air container having a capacity sufficient to contain a volume of air for at least one current interruption, a pipe line delivering compressed air to said container, insulating means serving as the sole support for said container and insulating it from earth, an air outlet opening in said container, a pair of contacts in said container in close proximity to said outlet opening, an insulating bushing projecting into said container and carrying one of the contacts of said pair, means for connecting the other of said contacts electrically with said container, valve means for opening and closing said contacts, means for the passage of extinguishing air from said outlet opening, and an air control valve in said last mentioned means for controlling the flow of air from the contact pair in said container through said outlet opening, said control valve being mounted for movement into the path of a movable contact of said contact pair and serving to control the extent of the movement of said movable contact.*

8. *An air blast circuit breaker as claimed in claim 5 in which the contact carried by the insulating bushing is the stationary contact.*

9. *An air blast circuit breaker comprising a metal compressed air container having a capacity sufficient to contain a volume of air for at least one current interruption, a pipe line delivering compressed air to said container, insulating means serving as the sole support for said container and insulating it from earth, an air outlet opening in said container, a pair of contacts in said container in close proximity to said outlet opening, an insulating bushing projecting into said container and carrying a stationary contact of said pair, means for electrically connecting a movable contact of said pair with the container, valve means for opening and closing said contacts, means for the passage of extinguishing air from said outlet opening, and an air control valve in said last mentioned means movable independently of said contacts for controlling the flow of air from the contact pair in said container through said outlet opening.*

10. *An air blast circuit breaker comprising a metal compressed air container having a capacity sufficient to contain a volume of air for at least one current interruption, a pipe line delivering compressed air to said container, insulating means serving as the sole support for said container and insulating it from earth, an air outlet opening in said container, disengageable contact means in said container in close proximity to said outlet opening, said contact means being movable to a circuit disengaged position in response to the connection of compressed air to said contacts, an insulating bushing projecting into said container and carrying one contact of said contact means, another contact of said contact means being electrically connected with the container, valve means operable to connect said compressed air to said disengageable contact means, said disengageable contact means being moved to said disengaged position in response to operation of said valve means, said air under pressure being retained in operative relation with respect to said disengageable contact means in order to retain said contacts in position to continuously isolate the circuit, means for the passage of extinguishing air from said outlet opening, and an air control valve in said last mentioned means for controlling the flow of air from the contact in said container through said outlet opening.*

11. *An air blast circuit breaker comprising a metal compressed air container having a capacity sufficient to contain a volume of air for at least one current interruption, a pipe line delivering compressed air to said container, insulating means serving as the sole support for said container and insulating it from earth, an air outlet opening in said container, disengageable contact means in said container in close proximity to said outlet opening, said contact means including a contact movable to a circuit disengaged position in response to the connection of compressed air to said contacts, an insulating bushing projecting into said container and carrying a stationary contact of said contact means, the movable contact of said contact means being electrically connected with the container, valve means operable to connect said compressed*

*air to said disengageable contact means, said disengageable contact means being moved to said disengaged position in response to operation of said valve means, said air under pressure being retained in operative relation with respect to said disengageable contact means in order to retain said contact means in disengaged position to continuously isolate the circuit, means for the passage of extinguishing air from said outlet opening, and an air control valve in said last mentioned means for controlling the flow of air from the disengageable contact means in said container through said outlet opening.*

*12. An air blast circuit breaker as claimed in claim 5 in which said contacts form the sole circuit isolating means.*

*13. An air blast circuit breaker comprising a metal compressed air container having a capacity sufficient to contain a volume of air for at least one current interruption, a pipe line delivering compressed air to said container, insulating means serving as the sole support for said container and insulating it from earth, an air outlet opening in said container, a pair of contacts in said container in close proximity to said outlet opening, an insulating bushing projecting into said container and carrying one of the contacts of said pair, means for connecting the other of said contacts electrically with said con-*

*tainer, said contact forming the sole circuit isolating means, valve means for opening and closing said contacts, and means for the passage of extinguishing air from said outlet opening and an air control valve in said last mentioned means for controlling the flow of air from the contact pair in said container through said outlet opening.*

References Cited in the file of this patent or the original patent

UNITED STATES PATENTS

| | | |
|---|---|---|
| 2,153,400 | Trencham | Apr. 4, 1939 |
| 2,221,720 | Prince | Nov. 12, 1940 |
| 2,306,186 | Rankin | Dec. 22, 1942 |
| 2,419,446 | Flurscheim | Apr. 22, 1947 |
| 2,447,656 | Ludwig et al. | Aug. 24, 1948 |
| 2,454,586 | Amer | Nov. 23, 1948 |
| 2,459,600 | Strom | Jan. 18, 1949 |
| 2,491,112 | Jansson | Dec. 13, 1949 |
| 2,532,529 | Amer | Dec. 5, 1950 |
| 2,507,210 | Ludwig et al. | May 9, 1950 |

FOREIGN PATENTS

| | | |
|---|---|---|
| 599,970 | Great Britain | Mar. 25, 1948 |
| 605,163 | Great Britain | July 16, 1948 |